(12) United States Patent
Lei

(10) Patent No.: US 10,774,480 B2
(45) Date of Patent: Sep. 15, 2020

(54) METHOD FOR PREPARING SIMULATED LAWN

(71) Applicant: GUANGZHOU ACT INDUSTRIAL CO., LTD., Guanghou, Guangdong (CN)

(72) Inventor: Ping Lei, Guangdong (CN)

(73) Assignee: GUANGZHOU ACT INDUSTRIAL CO., LTD., Guangzhou, Guangdong (CN)

(*) Notice: Subject to any disclaimer, the term of this patent is extended or adjusted under 35 U.S.C. 154(b) by 352 days.

(21) Appl. No.: 15/741,277

(22) PCT Filed: Mar. 16, 2017

(86) PCT No.: PCT/CN2017/076914
§ 371 (c)(1),
(2) Date: Dec. 31, 2017

(87) PCT Pub. No.: WO2018/113110
PCT Pub. Date: Jun. 28, 2018

(65) Prior Publication Data
US 2019/0048534 A1     Feb. 14, 2019

(30) Foreign Application Priority Data

Dec. 19, 2016 (CN) .......................... 2016 1 1178072

(51) Int. Cl.
| | | |
|---|---|---|
| *E01C 13/08* | (2006.01) | |
| *D01D 10/02* | (2006.01) | |
| *D01F 1/10* | (2006.01) | |
| *D04C 1/02* | (2006.01) | |
| *D04C 1/06* | (2006.01) | |
| *D02G 1/02* | (2006.01) | |
| *D02G 1/00* | (2006.01) | |

(Continued)

(52) U.S. Cl.
CPC .............. *E01C 13/08* (2013.01); *D01D 10/02* (2013.01); *D01F 1/10* (2013.01); *D01F 8/06* (2013.01);
(Continued)

(58) Field of Classification Search
CPC .......... A01G 7/00; A01G 20/00; A01G 20/20; E01C 13/08
(Continued)

(56) References Cited

U.S. PATENT DOCUMENTS 4,381,805 A * 5/1983 Troy ..................... D03D 27/00
139/391
4,617,208 A * 10/1986 Cadenhead, Sr. ...... D02G 1/002
428/17

(Continued)

FOREIGN PATENT DOCUMENTS

| CN | 2537571 Y | 2/2003 |
|---|---|---|
| CN | 101187083 A | 5/2008 |

(Continued)

OTHER PUBLICATIONS

International Search Report for PCT/CN2017/076914, dated Sep. 25, 2017, ISA/CN.

*Primary Examiner* — David J Parsley
(74) *Attorney, Agent, or Firm* — Yue (Robert) Xu; Apex Attorneys at Law, LLP

(57) ABSTRACT

A method for preparing a simulated lawn is provided, which comprises wiredrawing, coiling, weaving and post-processing raw materials, to obtain a simulated lawn product, wherein the weaving is straight yarn-curled yarn-interlacing weaving, in which one line of curled yarn is weaved between two adjacent straight yarns, and spacing between adjacent straight yarns is ⅜ to ¾ inches and knitting needle number is 150 to 350 needles/meter.

7 Claims, 2 Drawing Sheets

(51) Int. Cl.
*D01F 8/06* (2006.01)
*D05C 17/02* (2006.01)
*D01F 6/46* (2006.01)
*A01G 20/00* (2018.01)
*A01G 20/20* (2018.01)

(52) U.S. Cl.
CPC ............... *D02G 1/00* (2013.01); *D02G 1/002* (2013.01); *D02G 1/0286* (2013.01); *D04C 1/02* (2013.01); *D04C 1/06* (2013.01); *D05C 17/026* (2013.01); *A01G 20/00* (2018.02); *A01G 20/20* (2018.02); *D01F 6/46* (2013.01); *D10B 2321/021* (2013.01); *D10B 2505/202* (2013.01)

(58) Field of Classification Search
USPC .............................. 47/1.01 F, 58.1 R; 428/17
See application file for complete search history.

(56) References Cited

U.S. PATENT DOCUMENTS

| | | | | |
|---|---|---|---|---|
| 6,242,062 B1* | 6/2001 | de Vries | ................ | E01C 13/08 428/17 |
| 7,632,444 B2* | 12/2009 | Stroppiana | .............. | B29C 48/08 264/175 |
| 7,874,320 B2* | 1/2011 | Knapp | ................... | D03D 27/00 139/21 |
| 8,465,813 B2* | 6/2013 | Slootweg | ............... | D01D 5/247 428/17 |
| 2003/0099787 A1* | 5/2003 | Fink | ....................... | D02G 3/445 428/17 |
| 2015/0354147 A1* | 12/2015 | Fowler | ................... | D05C 15/10 428/22 |
| 2019/0376241 A1* | 12/2019 | Vachon | ................... | E01C 13/08 |

FOREIGN PATENT DOCUMENTS

| | | |
|---|---|---|
| CN | 101831265 A | 9/2010 |
| CN | 204238101 U | 4/2015 |
| CN | 104674630 A | 6/2015 |
| CN | 105568422 A | 5/2016 |
| CN | 205320643 U | 6/2016 |
| CN | 105924772 A | 9/2016 |
| CN | 105926078 A | 9/2016 |
| CN | 106087651 A | 11/2016 |
| JP | H0718618 A | 1/1995 |
| JP | 2004211311 A | 7/2004 |
| KR | 20160121192 A | 10/2016 |

* cited by examiner

METHOD FOR PREPARING SIMULATED LAWN

CROSS REFERENCE TO RELATED APPLICATION

This application is a National Stage application of PCT International Application PCT/CN2017/076914, titled "method for preparing simulated lawn", filed on Mar. 16, 2017, which claims priority to Chinese patent application No. 201611178072.0, titled "method for preparing simulated lawn", filed with the Chinese State Intellectual Property Office on Dec. 19, 2016, both of which are incorporated herein by reference.

FIELD

The present invention relates to the field of outdoor sports equipment, in particularly to a preparation method of a simulated lawn.

BACKGROUND

Lawn has ornamental, sports, leisure and other uses, so it is widely used in gardens, parks, sports grounds, golf courses and other venues. It is the best cover material that makes it easy for people to exercise on sports grounds. As early as the last century, lawn was used as a place to play bowling, battledore and shuttlecock in Europe; the British golf and football game also took place on the lawn. After that, a variety of land sports forged an indissoluble bound with the lawn. In 1960, the first simulated lawn using plastic chemical fiber products as raw materials was made by artificial methods in the United States, since then, simulated lawn ushered in vigorous development. Because it can meet the needs of 24 hours of high-intensity exercise, and has advantages such as simple conservation, rapid drainage, excellent field roughness, simulated lawn is widely used in football, hockey, tennis, golf, kindergartens, parks, shopping malls, leisure places, and the like.

In the prior art, conventional artificial grass products are filled with 3 to 5 cm of quartz sand and rubber particles as a filler under the pavement during laying the lawn so that their elasticity and traction properties are very close to the natural lawn, while enhancing the wear resistance of artificial grass, and increasing the use life of artificial grass. However, because the filler is mainly composed of quartz sand and rubber particles, the amount is very large, the filling process is very cumbersome, these improve the complexity of the laying process and increase the construction cost. In the high temperature weather or the high temperature areas, odor emitted by the filled particles made of rubber may also have impact on the athletes and so on. At the same time, when laying the lawn, it is hard to control the filling amount of filler particles; when recycling the lawn, it is difficult to deal with filler particles. All these do not meet today's theme of environmental protection. From above technical background, it can be concluded that the artificial grass products of the prior art have technical defects, such as complicated laying, odor after heating and complicated recycle process.

Therefore, developing a method for preparing a simulated lawn to solve the technical defects of artificial grass products in the prior art including complex laying, odor after heating and the complicated recycle process, has become an urgent problem to be solved by those skilled in the art.

SUMMARY

The present invention provides a method for preparing a simulated lawn, so to solve the technical defects of artificial grass products in the prior art, such as complex laying, odor after heating and complicated recycle process.

The present invention provides a method for preparing a simulated lawn, which comprises: wiredrawing, coiling, weaving and post-processing raw materials, to obtain the simulated lawn product, wherein, the weaving is straight yarn-curled yarn-interlacing weaving, in which one line of curled yarn is weaved between two adjacent straight yarns, and a spacing between adjacent straight yarns is $3/8$ to $3/4$ inches and a knitting needle number is 150 to 350 needles/meter.

Preferably, the wiredrawing method comprises: after mixing the raw materials, extruding, stretching, shaping and winding successively to obtain a straight grass yarn.

Preferably, by mass, the raw materials comprises 90 to 100 parts of linear low-density polyethylene, 0 to 10 parts of low-density polyethylene, 4 to 10 parts of color masterbatch, 1 to 2 parts of smooth masterbatch, and 0.7 to 1 part of PPA.

Preferably, the shaping is water mist shaping, and the temperature of the water mist shaping is 40° C. to 100° C.

Preferably, the curled yarn is obtained by circular-knitting shaping and rewinding of the straight grass yarn, and the height of the curled yarn obtained is less than 60% of that of the straight grass yarn.

Preferably, the preparation method further comprises twisting.

The straight grass yarn and the curled yarn are subjected to twisting before weaving.

Preferably, the post-processing comprises: gluing, drying and punching.

The turf obtained by weaving is subjected to gluing, drying and punching successively, and the final product simulated lawn is obtained.

Preferably, the adhesive used for gluing is selected from one or more of the group consisting of hydroxyl butylbenzene, acrylate and polyolefin. The amount of the adhesive used is 1.1 to 1.4 kg/m$^2$.

Preferably, the temperature of the drying is 120° C. to 140° C., and the duration of the drying is 1 to 20 min.

Preferably, the density of punching is 90 to 100 cm spacing between the longitudinally adjacent pores and 4 to 10 cm spacing between the laterally adjacent pores.

In view of the above, the present invention provides a method for preparing a simulated lawn, comprising: raw materials are subjected to wiredrawing, coiling, weaving and post-processing, to obtain a simulated lawn product, wherein, the weaving method is straight yarn-curled yarn-interlacing method, in which one line of curled yarn is weaved between two adjacent straight yarns, and spacing between adjacent straight yarns is $3/8$ ~$3/4$ inches and knitting needle number is 150 to 350 needles/meter. For the simulated lawn prepared by the technical solution provided by the present invention, the curled yarn replaces the filler of simulated turf in the prior art, and no filler particles are added during the laying. The laying process is simplified on the basis of ensuring the performance of the simulated lawn. At the same time, the product prepared by the technical embodiment of the present invention does not contain substances such as rubber particles which emit odor after heating, and can be directly recycled without separate treatment. These solutions overcome the technical defects of complicated laying, odor after heating and complicated recycle process in the prior art.

BRIEF DESCRIPTION OF THE DRAWINGS

In order to more clearly illustrate the embodiments of the present invention or the technical solutions in the prior art, the following drawings, which are to be used in the description of the embodiments or the prior art, will be briefly described. It will be apparent that the drawings in the following description is an embodiment of the present invention, it will be apparent to those skilled in the art that other drawings may be obtained in accordance with the drawings provided without inventive work.

DETAILED DESCRIPTION OF THE INVENTION

The present invention provides a method for preparing a simulated lawn to solve the technical defects of artificial turf products in the art, such as complex laying, odor after heating and complicated recycle process.

The technical solutions in the embodiments of the present invention will now be described more clearly and completely, and it will be apparent that the described embodiments are merely part of the embodiments of the invention and are not intended to be exhaustive. All other embodiments obtained by those of ordinary skill in the art without making creative work are within the scope of the present invention, based on embodiments in the present invention.

For a more detailed description of the present invention, a method for preparing a simulated lawn provided by the present invention will be described in detail with reference to the following examples.

Figure 1:
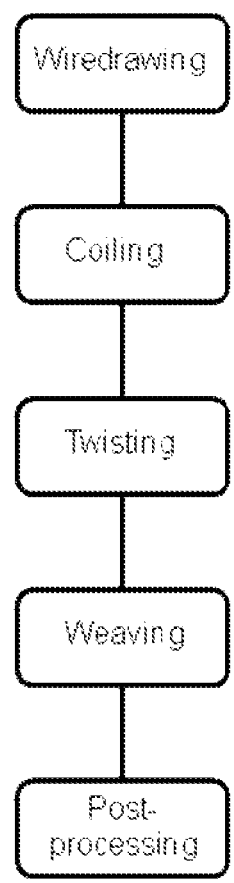
FIG. 1 shows a schematic diagram of a method for preparing a simulated lawn provided by the present invention.

As shown in FIG. 1, the present invention provides a method for preparing a simulated lawn, comprising: raw materials are subjected to wiredrawing, coiling, weaving and post-processing, to obtain a simulated lawn product, wherein, the weaving method is straight yarn-curled yarn-interlacing method, in which one line of curled yarn is weaved between two adjacent straight yarns, and the spacing between adjacent straight yarns is ⅜ ~¾ inches and knitting needle number is 150 to 350 needles/meter.

Since the simulated lawn prepared by the present invention does not add a filler, the turf of the simulated lawn of the present invention requires a grass yarn structure with high tufted density compared to other conventional simulated grass products, ensuring that even if the product is not added with a filler, the performance thereof is superior to that of the prior art, and therefore, for the specific weaving, the needle number is 150 to 350 needles/m, and the spacing between the straight yarns of the adjacent rows is ⅜ to ¾ inches. The actual realization of the straight yarn-curled yarn-interlacing mentioned in the present invention is to add one needle for wearing the curled yarn between two needles for weaving the straight yarn.

Figure 2:
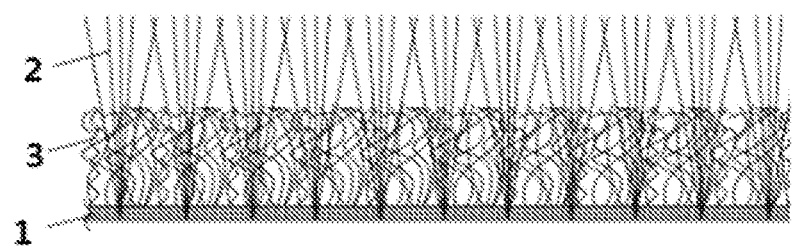
FIG. 2 shows a structural schematic diagram of a simulated lawn prepared by the method of the present invention, wherein, 1 is bottom fabric, 2 is straight yarn, and 3 is curled yarn.

The structure of the simulated lawn prepared by the above preparation method is shown in FIG. 2. As can be seen from FIG. 2, in the simulated lawn prepared by the method provided by the present invention, the curled yarn 3 is directly woven on the base fabric 1. The curled yarn 3 replaces the filler of the simulated lawn in the prior art, so that no filler particles are added during the laying process, thus the laying is simplified on the basis of ensuring the performance of the simulated lawn. Moreover, the surface of the curled yarn 3 is smooth without edges and corners. In football and other violent adversarial movements, the athletes fall injury will be significantly reduced, and there will be no abrasions.

At the same time, the simulated lawn prepared by the method of the present invention does not contain rubber particles and other materials emitting odor after heating, significantly reducing the damage to athletes' body. The lawn can be recycled directly without dealing with filler separately, thereby reducing the cost of recycling, meeting today's pursuit of environmental protection and high efficiency. The present invention overcomes the technical defects of the artificial grass products in the prior art, such as complicated laying, odor after heating and complicated recycle process.

In embodiments of the present invention, for the purpose of ensuring the safety of the product to human body, taking into account the purpose of reducing the production cost, by mass, the raw materials for preparing the simulated lawns comprise: 90 to 100 parts of linear low-density polyethylene, 0 to 10 parts of low-density polyethylene, 4 to 10 parts of color masterbatch, 1 to 2 parts of smooth masterbatch, and 0.7 to 1 parts of PPA.

Wiredrawing method for preparing the straight grass yarn is: raw materials are mixed, followed by extrusion, stretching, shaping and winding successively to obtain the straight grass yarn. Raw materials are plasticized and melted in the screw machine, extruded from the die of the machine, stretched and shaped to obtain grass yarns.

Since the simulated lawn prepared by the present invention does not contain fillers such as quartz sand and rubber particles, the grass yarns of such products require high stiffness, strength and abrasion resistance. In the embodiments, a "V-shaped" shape of the straight yarn of the simulated lawn is preferred. This special shape of the grass yarn in the mechanical structure will give the grass yarn very high stiffness, and at the same time large denier (D value) grass yarn process (≥1500D) is expected to be used, to ensure the strength of the grass yarn. Also, in respect to turf wear test, compared to other shapes of grass yarns, "V shape" grass yarn also showed better performance. The curled yarn part of the simulated lawn, used to replacing quartz sand and rubber particles and other fillers, needs higher strength, so in the wiredrawing process, we also hope to use a larger D value grass yarn process (≥700D).

In order to speed up the heat transfer rate, thereby the product to be shaped can be heated more rapidly and uniformly, the shaping method in the embodiments of the present invention is water mist shaping, which has a water mist temperature of 40° C. to 100° C. Water mist shaping can not only effectively reduce the shrinkage rate of grass yarn fiber, but also increase the crystallization of grass yarn fiber, and improve the strength and durability of grass yarn fiber.

In the embodiments of the present invention, the method for preparing the curled yarn is: the curled yarn is obtained by circular-knitting shaping and rewinding of the straight grass yarn prepared from above method with D value ≥700D. Since the curled yarn in the present invention is used to replace the filling material such as quartz sand and rubber particles, the height of the curled yarn is less than 60% of that of the straight yarn.

In order to make the straight grass yarns and the curled yarns have certain physical strength, thereby effectively extending the service life of the simulated lawn, the method for preparing a simulate lawn in the present invention also includes: twisting; straight grass yarn and curled yarn are subjected to twisting before weaving.

In order to effectively increase the stability of the woven turf and prevent the pulling out of the grass yarn, the present invention provides a method for preparing a simulated lawn, wherein post-process includes: gluing, drying and punching. The turf obtained by weaving is subjected to gluing, drying and punching successively, and the final product simulated lawn is obtained. Since most of the simulated lawns are used outdoors, in order to prevent rain waterlog from affecting the use of lawn, a pore structure is set on the bottom of the simulated lawn prepared according an embodiment of the present invention, which is made by a punch equipment in the punching step of the post-process. The punching density of the pore structure is 90 to 100 cm spacing in the longitudinally adjacent pores and 4 to 10 cm spacing in the laterally adjacent pores.

In order to further optimize the solutions, taking the safety and the reduction of the production cost into account, in the embodiments of the present invention, the adhesive used for gluing is one or more selected from the group consisting of hydroxy butylbenzene, acrylate and polyolefin, and the amount of the adhesive used is 1.1 to 1.4 kg/m².

In order to shorten the preparation time and improve the production efficiency, in the embodiment of the present invention, the drying temperature is 120° C. to 140° C., and the duration for drying is 1 to 20 min.

In sum, the present invention provides a method for preparing a simulated lawn, which comprises: raw materials are subjected to wiredrawing, coiling, weaving and post-processing, to obtain a simulated lawn product, wherein, the weaving method is straight yarn-curled yarn-interlacing method, in which one line of curled yarn is weaved between two adjacent straight yarns, and spacing between adjacent straight yarns is ⅜ to ¾ inches and knitting needle number is 150 to 350 needles/meter. In the simulated lawn prepared by the technical solution provided by the present invention, the curled yarn replaces the filler of simulated turf in the prior art, and no filler particles are added during the laying. The laying process is simplified on the basis of ensuring the performance of the simulated lawn. At the same time, the product prepared by the technical embodiment of the present invention does not contain substances such as rubber particles which emit odor after heating, and can be directly recycled without separate treatment. These solutions overcome the technical defects of complicated laying, odor after heating and complicated recycle process in the prior art.

The foregoing is only the preferred embodiment of the present invention and it should be noted that several improvements and modifications may be made by those of ordinary skill in the art without departing from the principles of the present invention. Those improvements and modifications should be regarded in the scope of the present invention.

The invention claimed is:

1. A method for preparing a simulated lawn, comprising: wiredrawing, coiling, weaving and post-processing raw materials, to obtain the simulated lawn,
    wherein the weaving is straight yarn-curled yarn-interlacing weaving, in which one line of curled yarn is weaved between two adjacent straight yarns, a spacing between adjacent straight yarns is ⅜ to ¾ inches and a knitting needle number is 150 to 350 needles/meter,
    wherein the wiredrawing comprises: after mixing the raw materials, extruding, stretching, shaping and winding successively to obtain a straight grass yarn,
    wherein the shaping is water mist shaping, and the temperature of the water mist shaping is 40° C. to 100° C., and
    wherein the curled yarn is obtained by circular-knitting shaping and rewinding of the straight grass yarn and height of the curled yarn is less than 60% of that of the straight grass yarn.

2. The preparation method of claim 1, wherein, by mass, the raw materials comprises 90 to 100 parts of linear low-density polyethylene, 0 to 10 parts of low-density polyethylene, 4 to 10 parts of color masterbatch, 1 to 2 parts of smooth masterbatch, and 0.7 to 1 part of PPA.

3. The preparation method of claim 1, wherein the preparation method further comprising twisting; and the straight grass yarn and the curled yarn are subjected to twisting before the weaving.

4. The preparation method of claim 3, wherein the post-processing comprises: gluing, drying and punching; and successive gluing, drying and punching are subjected to a turf obtained by weaving, to obtain a final product simulated lawn.

5. The preparation method of claim 4, wherein an adhesive used for gluing is selected from one or more of the group consisting of hydroxyl butylbenzene, acrylate and polyolefin, and the amount of the adhesive used is 1.1 to 1.4 kg/m'.

6. The preparation method of claim 4, wherein the temperature of the drying is 120° C. to 140° C., and the duration of the drying is 1 to 20 min.

7. The preparation method of claim 4, wherein a density of punching is 90 to 100 cm spacing between the longitudinally adjacent pores and 4 to 10 cm spacing between the laterally adjacent pores.

* * * * *